United States Patent Office 3,424,760
Patented Jan. 28, 1969

3,424,760
3-UREIDOPYRROLIDINES
Grover C. Helsley and William J. Welstead, Jr., Richmond, Va., assignors to A. H. Robins Company, Incorporated, Richmond, Va., a corporation of Virginia
No Drawing. Filed Mar. 7, 1966, Ser. No. 532,093
U.S. Cl. 260—326.3                          10 Claims
Int. Cl. C07d 27/04; A61k 27/00

ABSTRACT OF THE DISCLOSURE

New compounds which are 1-(1-substituted-3-pyrrolidinyl)-3-substituted ureas, the 1 substituent being phenyl, phenyllower-alkyl, or lower-cycloalkyl, and the 3 substituents (on the nitrogen atom) being on the one hand hydrogen or lower-alkyl and on the other hand hydrogen, lower-alkyl, or phenyl, the compounds exhibiting analgetic, central nervous system, and psychopharmacologic activities.

---

The present invention relates to certain novel heterocyclic organic compounds which may be referred to as substituted 3-ureidopyrrolidines, and is more particularly concerned with 1-(1-substituted-3-pyrrolidinyl)-3-substituted ureas, compositions thereof, and methods of making and using the same.

The invention is especially concerned with novel 3-ureidopyrrolidines having the formula:

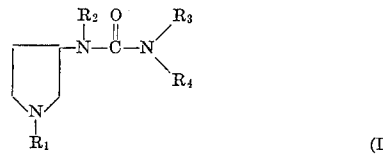

(I)

wherein $R_1$ is selected from the group consisting of phenyl, phenyllower-alkyl, and lower-cycloalkyl,
wherein $R_2$ is selected from the group consisting of hydrogen, lower-alkyl, and phenyl,
wherein $R_3$ is selected from the group consisting of hydrogen and lower-alkyl, and
wherein $R_4$ is selected from the group consisting of hydrogen, lower-alkyl, and phenyl,
and acid addition salts thereof.

The compounds of the invention having the foregoing Formula I are generally characterized by important pharmacological activity, and exhibit analgetic, central nervous system and psychopharmacologic activities. More specifically, the present compounds may be utilized in such applications as appetite suppression, CNS stimulation, anticonvulsant activity, and sedation. In addition, the compounds are relatively non-toxic and exhibit advantageous therapeutic ratios.

The activity of the active agents of the present invention has been evidenced by tests in lower animals. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

It is accordingly an object of the present invention to provide certain new and useful 1-(1-substituted-3-pyrrolidinyl)-3-substituted ureas, compositions thereof, and methods of making and using the same. Other objects of the invention will be aparent to one skilled in the art, and still other objects will become apparent hereinafter.

In the definition of symbols in the foregoing Formula I and where they appear elsewhere thruoghout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, sec. butyl, tertiary butyl, amyl, isoamyl, hexyl, heptyl, octyl, and the like. "Loweralkoxy" has the formula -0-lower-alkyl. The term "lowercycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcylopentyl, propylcyclopentyl, dimethylcyclohexyl, cycloheptyl, and cyclooctyl. "Phenylloweralkyl" are groups such as benzyl, phenethyl, methylbenzyl, phenpropyl, and the like.

When halogen is referred to herein, preferably but not necessarily a halogen of atomic weight in excess of nineteen but not greater than eighty is employed. Of the halogens, chlorine is preferred.

The compounds of Formula I may be converted to and are most conveniently employed in the form of nontoxic pharmaceutically acceptable acid addition salts. Such salts also have improved water-solubility. Although the non-toxic salts are preferred, any salt may be prepared for use as a chemical intermediate, as in the preparation of another but nontoxic acid addition salt. The free basic compounds of Formula I may be conveniently converted to their acid addition salts by reaction of the free base with the selected acid, preferably in the presence of an organic solvent inert to the reactants and reaction products under the conditions of the reaction. The acids which can be used to prepare the preferred nontoxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid atddition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The preferred acid addition salt is the hydrochloride.

The acid addition salts are prepared either by dissolving the free base in an aqueous solution containing appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, amonium hydroxide, sodium carbonate or the like (extracting the liberated base with a suitable solvent, illustratively ethyl acetate or benzene, drying the extract and evaporating to dryness or fractionally distilling, or in other conventional manner.

Methods of preparation

The preparation of 1-substituted-3-ureidopyrrolidines (I) when $R_3$ is hydrogen may be accomplished by mixing and reacting the appropriately substituted 3-aminopyrrolidine (II) with the appropriate isocyanate (III). The reaction sequence is illustrated by the following equation:

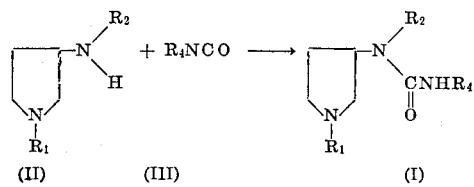

The reaction of the active hydrogen present on the amino group of the pyrrolidine (II) is carried out in an aprotic solvent such as benzene by the slow addition of the selected isocyanate. The reaction conditions may be varied dependent on the type of isocyanate employed. In the case of the aryl isocyanates, the rate of reaction is more rapid and the temperature of the reaction and reaction time are therefore shorter than required for the less reactive alkyl isocyanates.

When $R_3$ is other than hydrogen, that is, lower-alkyl, the compounds of the invention may be prepared by reacting the selected 3-aminopyrrolidine with the appropriate di-N-substituted carbamoyl chloride or other halide wherein $R_3$ and $R_4$ are substituents other than hydrogen.

General procedures for the preparation of the 3-ureidopyrrolidines are described below.

General method for the preparation of 3-ureidopyrrolidines using isocyanates

A solution composed of a 3-aminopyrrolidine (which is appropriately 1-substituted) in a dry aprotic solvent, such as benzene, is placed in a three-neck, round-bottom flask fitted with a stirrer, thermometer, dropping funnel and reflux condenser (fitted with a drying tube). While maintaining the temperature at approximately 5–25° C., an equimolar amount of organic isocyanate is added dropwise by means of the dropping funnel. The length of time required for the addition of the isocyanate may range from 0.5–1.0 hour. On completing the addition of the isocyanate to the 3-aminopyrrolidine, the reaction mixture is stirred for several hours while being maintained at room temperature. The product is then isolated by evaporating the solvent under reduced pressure, as for example in a rotary evaporator. The solid product obtained after removal of the solvent may be purified in an appropriate manner such as recrystallization from a selected solvent. A liquid product is usually converted to a salt, e.g., the fumarate.

General method for preparation of substituted ureas using carbamoyl chlorides

A solution of one part of an appropriately substituted carbamoyl halide, e.g., chloride, in an inert solvent such as chloroform, toluene, or benzene, is mixed with one part of a primary or secondary 1-substituted-3-aminopyrrolidine also dissolved in a non-reactive solvent as mentioned above. This reaction mixture may be heated at temperatures ranging from room temperature to the refluxing temperature of the solvent, preferably with mechanical stirring, until the reaction is essentially complete which usually requires 8 to 24 hours depending on the temperature and solvent used. Lower temperatures usually require an unnecessarily long reaction time, and higher ones may lead to side reactions and decomposition of the products. The reaction may be facilitated by the addition to the reaction mixture of one to two parts of an anhydrous basic salt such as sodium carbonate or potassium carbonate which will neutralize the formed hydrogen chloride. When such a salt is employed the reaction may be carried out at a lower temperature, such as room temperature; however, in order to assure completeness of the reaction, the mixture is usually finally heated at an elevated temperature (50–100°) for one to two hours.

When the reaction is complete, the mixture may be cooled in an ice bath and made basic with an aqueous alkali such as 2 N sodium hydroxide. The organic layer is separated, washed with water, dried over a drying agent such as sodium sulfate, and the solvent is then removed at reduced pressure. The residual product is dissolved in ether and the ethereal solution extracted with approximately 6 N hydrochloric acid or another suitable mineral acid. This acid solution is then made basic with aqueous alkali such as 25% NaOH and the oil which separates is dissolved in ether and dried over a drying agent such as magnesium sulfate. The ether is evaporated and the residue may usually be crystallized from a non-polar solvent such as octane, isooctane, or isopropyl ether.

Salts of the basic products may be formed, particularly of those bases which are not crystalline, by reacting equimolar quantities of the basic ureidopyrrolidine and a mineral acid such as hydrochloric or sulfuric, or an organic acid such as fumaric, maleic, benzoic, or sulfamic, in a suitable solvent such as ethanol or isopropanol. The salts are purified by recrystallizing from solvents similar to those in which they are formed.

General method of preparing 3-ureidopyrrolidines using cyanates

A further method for the preparation of (1-substituted-3-pyrrolidinyl)-ureas involves the employment of cyanates. The general method is illustrated by the following.

A solution of one part of a 1-substituted-3-aminopyrrolidine, in which the 3-amino group may be either primary or secondary, in an equivalent amount of a dilute (such as 1 normal) aqueous mineral acid, such as hydrochloric, is mixed with one part of a cyanate, such as sodium, potassium or ammonium cyanate, dissolved in a minimum amount of water. The mixture is stirred at room temperature or at slightly elevated temperatures until the reaction is essentially complete, usually requiring 2 to 12 hours. On cooling the product usually crystallizes and may be recrystallized from water or a mixture of water and alcohol.

This procedure is represented in greater detail by Example 5.

These procedures are more specifically described in the following examples which are given by way of illustration only and are not to be construed as limiting.

EXAMPLE 1

1-methyl-1-(1-phenyl-3-pyrrolidinyl)-3-methylurea

A stirred solution of 8 g. (0.045 mole) of 1-phenyl-3-methylaminopyrrolidine in 100 ml. of dry benzene was treated dropwise with 2.6 g. (0.045 mole) of methyl isocyanate in 50 ml. of dry benzene and allowed to stir an additional 30 minutes. The resulting white solid was filtered off and submitted for analysis without recrystallization. Yield: 7.3 g. (70%); M.P. 149–151° C.

*Analysis.*—Calculated for $C_{13}H_{19}N_3O$: C, 66.92; H, 8.21; N, 18.01. Found: C, 66.80; H, 8.43; N, 17.83.

EXAMPLE 2

1-methyl-1-(1-phenyl-3-pyrrolidinyl)-3-phenylurea

A stirred solution of 8 g. (0.045 mole) of 1-phenyl-3-methylaminopyrrolidine in 100 ml. of dry benzene was treated dropwise with 5.4 g. (0.045 mole) of phenyl isocyanate in 50 ml. of dry benzene and allowed to stir an additional 30 minutes. The resulting crystalline precipitate was filtered off and recrystallized from benzene-isooctane yielding 11.4 g. (86%) of pure product which melted at 176–179° C. Recrystallization of an analytical sample from the same solvent did not raise the melting point.

*Analysis.*—Calculated for $C_{18}H_{21}N_3O$: C, 73.19; H, 7.17; N, 14.23. Found: C, 73.33; H, 7.22; N, 14.06.

EXAMPLE 3

1-(1-phenyl-3-pyrrolidinyl)-3-phenylurea

A solution of 4 g. (0.025 mole) of 1-phenyl-3-aminopyrrolidine in 50 ml. of dry benzene was stirred under a nitrogen atmosphere while 2.96 g. (0.025 mole) of phenyl isocyanate in 30 ml. of dry benzene was added dropwise. The mixture was allowed to stir for 30 minutes after addition, during which time a white crystalline product precipitated. The product, 6.1 g. (89%) was collected by filtration, washed with benzene and dried; M.P. 185–187° C. An analytical sample recrystallized from benzene melted at 184–186° C.

*Analysis.*—Calculated, for $C_{17}H_{19}N_3O$: C, 72.57; H, 6.81; N, 14.94. Found: C, 72.86; H, 6.74; N, 15.05.

EXAMPLE 4

1,1-diethyl-3-methyl-3-(1-phenyl-3-pyrrolidinyl)-urea

A solution of 5 g. (0.028 mole) of 1-phenyl-3-methyl-amino-pyrrolidine in 25 ml. of chloroform was added to a solution of 6.5 g. of potassium carbonate in 25 ml. of water. The two-phase system was then treated with 3.85 g. (0.028 mole) of diethylcarbamoyl chloride in 25 ml. of chloroform. After addition the reaction mixture was heated and allowed to reflux for 4 hours. The chloroform layer was separated, dried over magnesium sulfate and evaporated to an oil (7 g.). The impure oil was dissolved in benzene and chromatographed using 150 g. of 60–100 mesh Florisil (hydrated aluminosilicate adsorbent). The compound was eluted with 1% acetone-benzene. Distillation of the chromatographed product gave 1.8 g. (23%) of pure oil (156–158% C./0.01 mm.).

*Analysis.*—Calculated for $C_{16}H_{25}N_3O$: C, 69.78; H, 9.15; N, 15.26. Found: C, 68.93; H, 9.04; N, 15.26.

EXAMPLE 5

(1-phenyl-3-pyrrolidinyl)-urea

A solution of 5 g. (0.031 mole) of 1-phenyl-3-amino-pyrrolidine in 31 ml. of 1 N HCl was treated all at once with 2.5 g. (0.031 mole) of potassium cyanate in 5 ml. of water. The mixture was stirred for 4 hours at room temperature, whereafter the resulting precipitate was filtered off and washed with water. The product melted at 195-197° C. after recrystallization from methanol-water; yield 4.5 g. (71%).

*Analysis.*—Calculated for $C_{11}H_{15}N_3O$: C, 64.36; H, 7.37; N, 20.47. Found: C, 64.55; H, 7.36; N, 20.46.

EXAMPLE 6

1-(1-cyclohexyl-3-pyrrolidinyl)3-3isopropylurea

Using the method of Example 1, equimolar amounts of 1-cyclohexyl-3-aminopyrrolidine and isopropyl isocyanate were mixed and reacted together to give 1-(1-cyclohexyl-3-pyrrolidinyl)-3-isopropylurea. The purified compound was obtained in 82% yield and had a melting point of 151–152° C.

*Analysis.*—Calculated for $C_{14}H_{27}N_3O$: C, 66.39; H, 10.74; N, 16.58. Found: C, 66.60; H, 10.65; N, 16.39.

EXAMPLE 7

1-(2-benzyl-3-pyrrolidinyl)-3-phenylurea

Using the method of Example 1, equimolar amounts of 1-benzyl-3-aminopyrrolidine and phenyl isocyanate were mixed and reacted together to give 1-(1-benzyl-3-pyrrolidinyl)-3-phenylurea. The purified compound was obtained in 81% yield and had a melting point of 175-176° C.

*Analysis.*—Calculated for $C_{18}H_{21}N_3O$: C, 73.19; H, 7.17; N, 14.23. Found: C, 73.45; H, 7.19; N, 13.98.

EXAMPLE 8

1-phenyl-1-(1-phenethyl-3-pyrrolidinyl)-3-methylurea

Using the method of Example 1, equimolar amounts of 1-phenethyl-3-methylaminopyrrolidine and methyl isocyanate were mixed and reacted together to give 1-phenyl-1-(1-phenethyl-3-pyrrolidinyl)-3-methylurea. The purified compound was obtained in 65% yield. The fumarate salt of the compound had a melting point of 115-117° C.

*Analysis.*—Calculated for $C_{24}H_{29}N_3O_5$: C, 65.58; H, 6.55; N, 9.56. Found: C, 65.17; H, 6.73; N, 9.50.

EXAMPLE 9

1,3-dimethyl-1-phenyl-3-(1-phenyl-3-pyrrolidinyl)-urea

A toluene solution of N-methylanilinocarbamyl chloride is prepared by reacting together equimolar proportions of N-methylaniline and phosgene, both in the form of a toluene solution thereof, at a temperature of 0–5° C. The reaction mixture is stirred continuously and is finally allowed to come to room temperature while stirring is continued. Unreacted N-methylaniline is filtered off as the hydrochloride and the residual toluene solution of N-methyl-anilinocarbamyl chloride is used in the next step of the process.

A solution of approximately 0.028 mole of 1-phenyl-3-methylaminopyrrolidine in 25 ml. of toluene is added to a solution of 6.5 grams of potassium carbonate in 25 ml. of water. The two-phase system is then treated with 0.028 mole of N-methylanilino-carbamyl chloride in approximately 25 milliliters of toluene. Chloroform can be substituted for the toluene when convenient. After addition, the reaction mixture is heated and allowed to reflux for approximately four hours. The organic layer is separated, dried over magnesium sulfate, and evaporated to an oil. The impure oil is dissolved in benzene and chromatographed on a suitable column and eluted therefrom with a suitable solvent, as in Example 4. Distillation of the chromatographed product produces the desired 1,3-dimethyl-1-phenyl-3-(1-phenyl-3-pyrrolidinyl) - urea. The product is stable upon distillation and may be obtained from the crude oil directly by distillation without chromatography in reduced yields if desired.

Additional N-lower-alkylaniline compounds can be reacted with phosgene in the manner of the preceding example and the resulting carbamyl chloride thereafter further reacted with the selected 1-phenyl-, 1-phenyllower-alkyl-, or 1-lower-cycloalkyl-3-amino-, 3-lower-alkylamino-, or 3-phenylaminopyrrolidine, in each case to give the desired 3-ureidopyrrolidine of Formula I wherein $R_3$ is lower-alkyl and $R_4$ is phenyl.

Formulation and administration

Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition salts for purposes of convenience of crystallization, increased solubility, and the like. Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result desired. Five to fifty milligrams appears optimum per unit dose, while usual broader ranges appear to be one to 100 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles. Results upon administration of these novel materials have thus far proved extremely gratifying.

It is to be understood that the invention is not to be limited to the exact details of operation or exact compounds shown and described, as obvious modificaions and equivalents will be apparent to one skilled in the art, and the invention is therefore to be limited only by the scope of the appended claims.

We claim:
1. A compound selected from the group consisting of compounds having the formula:

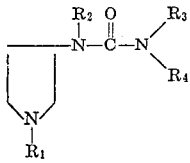

wherein $R_1$ is selected from the group consisting of phenyl, phenyllower-alkyl, and lower-cycloalkyl,
wherein $R_2$ is selected from the group consisting of hydrogen, lower-alkyl, and phenyl,
wherein $R_3$ is selected from the group consisting of hydrogen and lower-alkyl, and
wherein $R_4$ is selected from the group consisting of hydrogen, lower-alkyl, and phenyl,
and acid addition salts thereof; provided $R_2$ being other than phenyl when $R_3$ is hydrogen and $R_4$ is phenyl or lower alkyl.

2. A compound of claim 1 which is 1-methyl-1-(1-phenyl-3-pyrrolidinyl)-3-methylurea.

3. A compound of claim 1 which is 1-methyl-1-(1-phenyl-3-pyrrolidinyl)-3-phenylurea.

4. A compound of claim 1 which is 1-(1-phenyl-3-pyrrolidinyl)-3-phenylurea.

5. A compound of claim 1 which is 1,1-diethyl-3-methyl-3-(1-phenyl-3-pyrrolidinyl)-urea.

6. A compound of claim 1 which is (1-phenyl-3-pyrrolidinyl)urea.

7. A compound of claim 1 which is 1-(1-cyclohexyl-3-pyrrolidinyl)-3-isopropylurea.

8. A compound of claim 1 which is 1-(1-benzyl-3-pyrrolidinyl)-3-phenylurea.

9. A compound of claim 1 which is 1-phenyl-1-(1-phenethyl-3-pyrrolidinyl)-3-methylurea.

10. A compound of claim 1 which is a 1-phenyl-1-(1-phenethyl - 3-pyrrolidinyl)-3-methylurea pharmaceutically acceptable acid addition salt.

References Cited

Chiti et al., Chemical Abstracts, vol. 53, pp. 18, 958 (1959).

ALEX MAZEL, *Primary Examiner.*

JOSE TOVAL, *Assistant Examiner.*

U.S. Cl. X.R.

167—55, 65

UNITED STATES PATENT OFFICE
CERTIFICATE OF CORRECTION

Patent No. 3,424,760

January 28, 1969

Grover C. Helsley et al.

It is certified that error appears in the above identified patent and that said Letters Patent are hereby corrected as shown below:

Column 1, line 71, "thrughout" should read -- throughout --. Column 2, line 38, "atddition" should read -- addition --. Column 3, line 46, "solvent as mentioned" should read -- solvent such as mentioned --. Column 5, line 37, "3-3 isopropylurea" should read -- -3-isopropylurea --; line 48, "1-(2-benzyl" should read -- 1-(1-benzyl --; line 68, "H, 6.55" should read -- H, 6.65 --.

Signed and sealed this 24th day of March 1970.

(SEAL)
Attest:

Edward M. Fletcher, Jr.
Attesting Officer

WILLIAM E. SCHUYLER, JR.
Commissioner of Patents